US010684531B1

(12) United States Patent
Ziemkiewicz et al.

(10) Patent No.: US 10,684,531 B1
(45) Date of Patent: Jun. 16, 2020

(54) HYBRID OPTICAL BEAM STEERING

(71) Applicant: Analog Devices, Inc., Norwood, MA (US)

(72) Inventors: Michael Ziemkiewicz, Lakewood, CO (US); Tyler Adam Dunn, North Reading, MA (US); Michael Howard Anderson, Lyons, CO (US); Scott Robert Davis, Denver, CO (US)

(73) Assignee: Analog Devices, Inc., Norwood, MA (US)

( * ) Notice: Subject to any disclaimer, the term of this patent is extended or adjusted under 35 U.S.C. 154(b) by 0 days.

(21) Appl. No.: 16/283,229

(22) Filed: Feb. 22, 2019

(51) Int. Cl.
*G02F 1/295* (2006.01)
*G02F 1/13* (2006.01)
*G02B 26/10* (2006.01)

(52) U.S. Cl.
CPC ......... *G02F 1/2955* (2013.01); *G02B 26/108* (2013.01); *G02F 1/1326* (2013.01); *G02F 2201/122* (2013.01); *G02F 2203/24* (2013.01)

(58) Field of Classification Search
CPC ...... G02F 1/2955; G02F 1/1326; G02F 1/365; G02F 2203/24; G02F 2201/122; G02B 26/108
See application file for complete search history.

(56) References Cited

U.S. PATENT DOCUMENTS

| 3,447,855 A | 6/1969 | Skinner |
| 3,458,247 A | 7/1969 | Buhrer et al. |
| 3,485,553 A | 12/1969 | Lee |
| 3,510,199 A | 5/1970 | Lee |
| 5,802,223 A * | 9/1998 | Nashimoto ............. G02F 1/295 385/2 |

(Continued)

FOREIGN PATENT DOCUMENTS

| CN | 1523394 | 8/2004 |
| TW | 201044013 | 12/2010 |
| TW | 201610951 | 3/2016 |

OTHER PUBLICATIONS

"U.S. Appl. No. 15/479,999, Amendment Under 37 CFR 1.312 Filed Apr. 27, 2018", 10 pgs.

(Continued)

*Primary Examiner* — Ryan A Lepisto
*Assistant Examiner* — Erin D Chiem
(74) *Attorney, Agent, or Firm* — Schwegman Lundberg & Woessner, P.A.

(57) ABSTRACT

A light beam can be steered using a non-mechanical beam steerer structure. For example, a combination of sub-aperture and full-aperture beam steering structures can be used (e.g., corresponding to regions of controlled variation in an index of refraction). The sub-aperture elements can include tapered structures defining a saw-tooth or triangular footprint in the plane in which the in-plane steering is performed. Respective rows of sub-aperture tapered structures can be configured to controllably steer the light beam in the first in-plane direction, wherein at least one row of sub-aperture tapered structures defines a first base region edge that is tipped at a first specified in-plane angle relative to a second base region edge defined by another row. Use of the tipped configuration can simplify a configuration of the beam steerer structure, such as allowing a configuration lacking a compensation plate at the input.

20 Claims, 8 Drawing Sheets

(56) References Cited

U.S. PATENT DOCUMENTS

| | | | |
|---|---|---|---|
| 5,920,662 A * | 7/1999 | Hinkov | G02F 1/295 359/322 |
| 6,400,855 B1 * | 6/2002 | Li | G02F 1/2955 385/16 |
| 6,774,871 B2 * | 8/2004 | Birdwell | G02F 1/292 345/48 |
| 6,985,373 B2 | 1/2006 | Tsu | |
| 7,027,670 B2 * | 4/2006 | Aoki | G02F 1/295 385/10 |
| 7,146,070 B1 | 12/2006 | Li et al. | |
| 7,233,261 B2 | 6/2007 | Nunnally et al. | |
| 7,570,320 B1 | 8/2009 | Anderson et al. | |
| 7,720,116 B2 | 5/2010 | Anderson et al. | |
| 8,311,372 B2 | 11/2012 | Anderson et al. | |
| 8,380,025 B2 | 2/2013 | Anderson et al. | |
| 8,463,080 B1 | 6/2013 | Anderson et al. | |
| 8,860,897 B1 | 10/2014 | Anderson et al. | |
| 8,989,523 B2 | 3/2015 | Anderson et al. | |
| 9,033,888 B2 | 5/2015 | Brown et al. | |
| 9,366,938 B1 | 6/2016 | Anderson et al. | |
| 9,730,676 B2 | 8/2017 | Brown et al. | |
| 9,829,766 B2 | 11/2017 | Anderson et al. | |
| 9,880,443 B2 | 1/2018 | Anderson | |
| 9,885,892 B2 | 2/2018 | Anderson et al. | |
| 10,120,261 B2 | 11/2018 | Ziemkiewicz et al. | |
| 10,133,083 B1 | 11/2018 | Ziemkiewicz et al. | |
| 2002/0114556 A1 * | 8/2002 | Kato | G02B 6/125 385/16 |
| 2003/0118262 A1 * | 6/2003 | Aoki | G02F 1/295 385/8 |
| 2004/0264229 A1 | 12/2004 | Tsu | |
| 2005/0123228 A1 * | 6/2005 | Nishizawa | G02F 1/295 385/4 |
| 2005/0271325 A1 * | 12/2005 | Anderson | G02F 1/295 385/40 |
| 2006/0072186 A1 | 4/2006 | Nunnally et al. | |
| 2007/0133079 A1 | 6/2007 | Cernasov | |
| 2008/0008413 A1 | 1/2008 | Anderson et al. | |
| 2008/0008414 A1 | 1/2008 | Anderson et al. | |
| 2009/0015904 A1 * | 1/2009 | Okayama | G02F 1/29 359/315 |
| 2012/0269478 A1 | 10/2012 | Anderson et al. | |
| 2012/0296215 A1 | 11/2012 | Brown et al. | |
| 2013/0258452 A1 * | 10/2013 | Kamiguchi | G02F 1/2955 359/315 |
| 2013/0259417 A1 * | 10/2013 | Kamiguchi | G02F 1/2955 385/8 |
| 2015/0366542 A1 | 12/2015 | Brown et al. | |
| 2017/0038590 A1 | 2/2017 | Jepsen | |
| 2017/0038591 A1 | 2/2017 | Jepsen | |
| 2017/0039904 A1 | 2/2017 | Jepsen | |
| 2017/0039906 A1 | 2/2017 | Jepsen | |
| 2017/0039907 A1 | 2/2017 | Jepsen | |
| 2017/0039960 A1 | 2/2017 | Jepsen | |
| 2017/0059960 A1 | 3/2017 | Shi et al. | |
| 2017/0115519 A1 | 4/2017 | Shi et al. | |
| 2017/0153530 A1 | 6/2017 | Anderson et al. | |
| 2017/0192264 A1 | 7/2017 | Anderson et al. | |
| 2017/0212404 A1 | 7/2017 | Anderson et al. | |
| 2018/0292727 A1 | 10/2018 | Ziemkiewicz et al. | |

OTHER PUBLICATIONS

"U.S. Appl. No. 15/479,999, Final Office Action dated Dec. 18, 2017", 12 pgs.

"U.S. Appl. No. 15/479,999, Non Final Office Action dated Aug. 28, 2017", 15 pgs.

"U.S. Appl. No. 15/479,999, Notice of Allowability dated May 31, 2018", 4 pgs.

"U.S. Appl. No. 15/479,999, Notice of Allowance dated Jan. 30, 2018", 12 pgs.

"U.S. Appl. No. 15/479,999, Notice of Allowance dated Jul. 20, 2018", 9 pgs.

"U.S. Appl. No. 15/479,999, PTO Response to Rule 312 Communication dated May 11, 2018", 3 pgs.

"U.S. Appl. No. 15/479,999, Response filed Jan. 5, 2018 to Final Office Action dated Dec. 18, 2017", 9 pgs.

"U.S. Appl. No. 15/479,999, Response filed Nov. 28, 2017 to Non Final Office Action dated Aug. 28, 2017", 13 pgs.

"U.S. Appl. No. 15/678,741, Examiner Interview Summary dated Sep. 28, 2018", 2 pgs.

"U.S. Appl. No. 15/678,741, Notice of Allowance dated May 25, 2018", 16 pgs.

"U.S. Appl. No. 15/678,741, Notice of Allowance dated Aug. 29, 2018", 10 pgs.

"U.S. Appl. No. 15/678,741, Preliminary Amendment filed Jul. 18, 2018", 9 pgs.

"Move Your Light Not Your Mirrors: A New Analog, EO Beamsteerer With Unprecedented Performance", (Sep. 8, 2008), 2 pages.

"Vescent_New_SPIE_Newsroom", (Mar. 23, 2011), 4 pages.

"Vescent_SPIE_Newsroom", (Dec. 21, 20017), 5 pages.

Chao, Tien-Hsin, et al., "Compact liquid crystal waveguide based Fourier transform spectrometer for in-situ and remote gas and chemical sensing", Proc. of SPIE vol. 6977 69770P-10, (Mar. 17, 2008), 12 pages.

Chao, Tien-Hsin, et al., "Monolithic liquid crystal waveguide Fourier transform spectrometer for gas species sensing", Proc. of SPIE vol. 8055 805506-1, (Apr. 26, 2011), 14 pages.

Davis, S P, et al., "Fourier Transform Spectrometry", SPIE_LCWFTSnewsroom_final, (Jun. 19, 2008), 3 pages.

Davis, Scott R., et al., "A lightweight, rugged, solid state laser radar system enabled by nonmechanical electro-optic beam steerers", Proc. of SPIE vol. 9832, Laser Radar Technology and Applications XXI, (May 13, 2016), 12 pgs.

Davis, Scott R., et al., "A new electro-optic waveguide architecture and the unprecedented devices it enables", Proc. of SPIE vol. 6975 697503-1, (Mar. 24, 2008), 13 pages.

Davis, Scott R., et al., "A new generation of previously unrealizable photonic devices as enabled by a unique electro-optic waveguide architecture", Proc. of SPIE vol. 7050 705005-1, (Aug. 27, 2008), 16 pages.

Davis, Scott R., et al., "A new photonics technology platform and its applicability for coded aperture techniques", Proc. of SPIE vol. 8165 81651E-1, (Sep. 13, 2011), 10 pages.

Davis, Scott R., et al., "Analog, non-mechanical beamsteerer with 80 degree field of regard", Proc. of SPIE vol. 6971, Acquisition, Tracking, Pointing, and Laser Systems Technologies XXII, 69710G, (Mar. 24, 2008), 12 pgs.

Davis, Scott R., et al., "Large-Angle Electro-Optic Laser Scanner", (Mar. 31, 2008), 2 pages.

Davis, Scott R., et al., "Liquid crystal clad waveguide laser scanner and waveguide amplifier for LADAR and sensing applications", Proc. of SPIE vol. 9365 93650N-1, (Feb. 27, 2015), 13 pages.

Davis, Scott R., et al., "Liquid Crystal Waveguides: New Devices Enabled by >1000 Waves of Optical Phase Control", SPIE 2010, (Jul. 1, 2010), 14 pages.

Davis, Scott R., et al., "New electro-optic laser scanners for small-sat to ground laser communication links", Proc. of SPIE vol. 8739 87390H-1, (May 21, 2013), 11 pages.

Davis, Scott R., et al., "New Wide Angle Electro-Optic Laser Scanners Enable Optical Sensors on Previously Inaccessible Platforms", AIWB Laser Applications, Imaging and Applied Optics: OSA Optics & Photonics Congress, Toronto CA, Jul. 10-14, 2011, (Jul. 10, 2011), 3 pages.

Davis, Scott R., et al., "Next-generation photonic true time delay devices as enabled by a new electro-optic architecture", Proc. of SPIE vol. 8739 87390G-1, (May 21, 2013), 16 pages.

Davis, Scott, "Vescent Power Handling", (Jun. 15, 2018), 2 pages.

Farca, George, et al., "An Analog, Non-Mechanical Beam-Steerer with an 80 Degree Field of Regard for LIDAR Applications", Vescent Photonics ILMF 2008 Presentation, (Jan. 30, 2008), 11 pages.

Frantz, Jesse A., et al., "Non-mechanical beam steering in the mid-wave infrared", Proc. of SPIE vol. 10181 101810X-1, (May 11, 2017), 8 pages.

(56) References Cited

OTHER PUBLICATIONS

Keller, Sean D., et al., "Emerging liquid crystal waveguide technology for low SWaP active short-wave infrared imagers", Proc. of SPIE vol. 9384 93840M-1, (Mar. 11, 2015), 10 pages.

Luey, Ben, et al., "A Lightweight, Cost-Efficient, Solid-State LIDAR System Utilizing Liquid Crystal Technology for Laser Beam Steering for Advanced Driver Assistance", (Apr. 1, 2017), 9 pages.

Ziemkiewicz, Michael, et al., "Laser-based satellite communication systems stabilized by nonmechanical electro-optic scanners", Proc. of SPIE vol. 9828 982808-1, (May 17, 2016), 13 pages.

\* cited by examiner

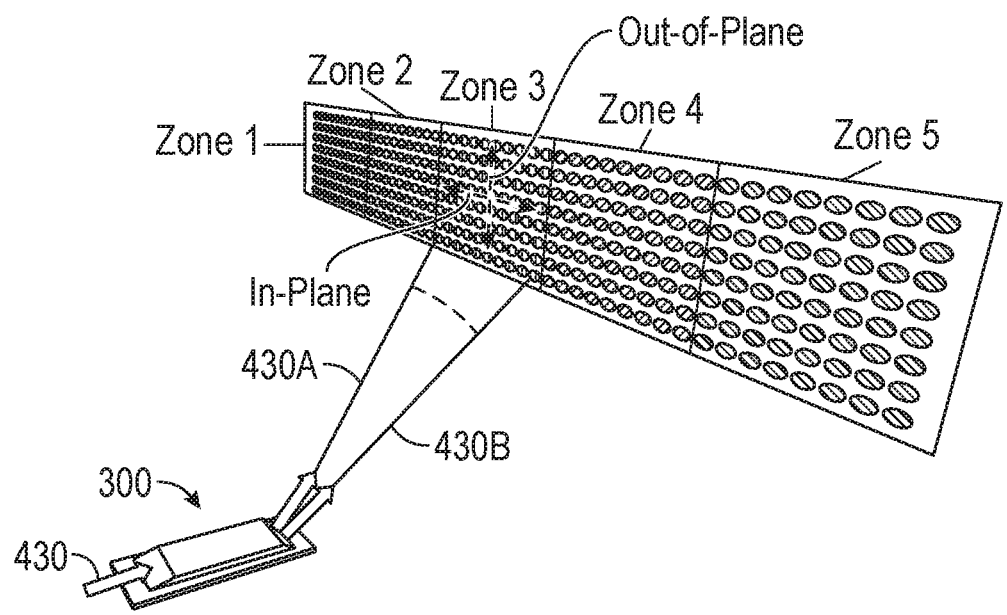
FIG. 4
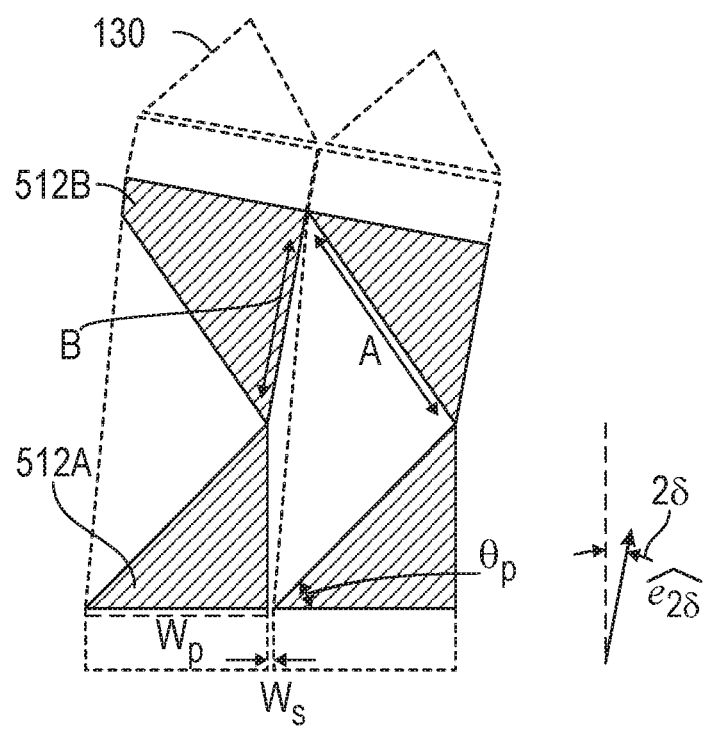
FIG. 5A
FIG. 5B
FIG. 5C

HYBRID OPTICAL BEAM STEERING

FIELD OF THE DISCLOSURE

This document pertains generally, but not by way of limitation, to apparatus and techniques that can be used for steering a light beam, such as for non-mechanical beam steering of a laser to provide illumination of objects for detection by an optical receiver.

BACKGROUND

An optical detection system, such as a system for providing light detection and ranging (LIDAR), generally includes a light source (e.g., an illuminator) and an optical receiver. Various schemes can be used to provide illumination of a field-of-regard, such as a flash technique in which a large portion or an entirety of the of the field-of-regard is illuminated contemporaneously. In another approach, scanning can be used to selectively illuminate portions of the field-of-regard. Such scanning can include use of one or more mechanical actuators such as rotating or oscillating mirrors or prism structures to orient a beam of light toward specified portions of the field-of-regard. In another approach, a non-mechanical beam steering technique can be used, either alone or in combination with a mechanically-scanned technique. Applications for a non-mechanical beam steerer can include LIDAR or obstacle detection, more generally. LIDAR or obstacle detection can be applied in vehicular applications, such as to facilitate operation of autonomous vehicles. Other applications can include beam guidance to facilitate communication or tracking of an object, for example.

SUMMARY OF THE DISCLOSURE

In one approach, a non-mechanical beam steerer can be implemented using a liquid crystal waveguide (LCW) structure. The present inventors have recognized that certain configurations (e.g., patterns) of refractive index gradients can be used to provide in-plane beam steering of an optical beam propagating through a planar waveguide core of an LCW structure. For example, a portion of the optical beam can interact with a material cladding the waveguide core. Inducing prism-shaped variations in a refractive index in the cladding material can be used to alter an effective refractive index encountered by the propagating light beam in the waveguide core, without requiring manipulation of the bulk refractive index of the waveguide core material. The cladding can include an electro-optic material (e.g., a liquid crystal material). Imposing an electric field on the electro-optic material can alter an index of refraction of the electro-optic material. Optical energy propagating through the waveguide can interact with the electro-optic material cladding the waveguide core, and a direction of propagation of the optical energy (e.g., a beam) can be controllably adjusted, such as by applying a control signal to an electrode structure to force a potential across portions of the electro-optic material.

The present inventors have recognized, among other things, that a combination of sub-aperture and full-aperture beam steering structures can be used (e.g., corresponding to regions of controlled variation in an index of refraction). For example, a beam steerer can include a combination of sub-aperture and full-aperture steering elements, such as to provide coarse and fine angular steering, respectively, of a light beam in an in-plane direction. The phrase "full-aperture" can refer to a lateral width of the steering structure being substantially similar to or greater than a lateral width of the light beam (e.g., a width in the in-plane direction). The phrase "sub-aperture" can refer to a lateral width of the steering structure being less than the lateral width of the light beam such that the light beam encompasses multiple sub-aperture elements in lateral extent in the in-plane direction. A structure combining sub-aperture and full-aperture portions can be referred to as a hybrid beam steerer. Use of such a hybrid structure allows the sub-aperture portion to steer incident light in-plane in one or more discrete angular increments, which does not require a separate compensation "plate" structure at the input. Eliminating a compensation plate can also provide an enhanced range of acceptance angles for the beam steerer structure.

Generally, the sub-aperture elements include tapered structures (e.g., prism structures defining a saw-tooth or triangular footprint in the plane in which the in-plane steering is performed, where the prism structures generally have a lateral width less than the lateral width of the light beam). For example, at least two rows of sub-aperture tapered structures can be configured to controllably steer the light beam in a first in-plane direction, wherein at least one row amongst the at least two rows of sub-aperture tapered structures is tipped at a first specified in-plane angle relative to a another row amongst the at least two rows, the first specified in-plane angle oriented in the first in-plane direction. Use of a configuration where one row of sub-aperture structure is tipped relative to another row can substantially reduce diffractive scattering losses as compared to other approaches.

A pitch of the sub-aperture tapered structures can be established such that an angle of a sub-aperture portion of the light beam steered by a respective one of the sub-aperture tapered structures corresponds to an angle of a diffractive order of a row of the sub-aperture tapered structures comprising the respective one. In this manner, the sub-aperture tapered structures can be referred to as a "blazed" structure. Successive rows of sub-aperture tapered structures can be used to provide beam steering in discrete angular increments. A second beam steering portion comprising full-aperture beam steering elements can be used to refract the light beam in the first in-plane direction, such as to provide finer angular resolution to steer the beam about (e.g., around in the in-plane direction) angles corresponding to the discrete angular increments (e.g., coarse increments) provided by the sub-aperture portion of the beam steering apparatus.

In an example, a beam steering apparatus can be used to adjust an angle of a light beam, the beam steering apparatus comprising a first beam steering portion comprising at least two rows of sub-aperture tapered structures configured to controllably steer the light beam in a first in-plane direction, wherein at least one row amongst the at least two rows of sub-aperture tapered structures is tipped at a first specified in-plane angle relative to another row amongst the at least two rows, the first specified in-plane angle oriented in the first in-plane direction and a second beam steering portion comprising full-aperture beam steering elements to refract the light beam in the first in-plane direction.

For example the beam steering apparatus mentioned above can include that the first beam steering portion is configured to provide selectable steering of the light beam to discretely-defined in-plane angular positions in response to a first control signal and that the second beam steering portion is configured to provide selectable steering of the light beam about the discretely-defined in-plane angular positions in response to a second control signal.

In an example, an optical waveguide can be used for performing beam steering of a light beam, the optical waveguide comprising a waveguide core configured to guide the light beam along a length of a waveguide, a cladding including an electro-optic material, the cladding configured to interact with a portion of the light beam guided by the waveguide, and an electrode arrangement configured to adjust an angle of the light beam in an in-plane direction by adjusting an index of refraction of the electro-optic material. The electrode arrangement can include a first beam steering arrangement comprising at least two rows of sub-aperture tapered electrodes configured to control steering the light beam in a first in-plane direction, wherein at least one row amongst the at least two rows of sub-aperture tapered structures is tipped at a first specified in-plane angle relative to a another row amongst the at least two rows, the first specified in-plane angle oriented in the first in-plane direction and a second beam steering portion comprising full-aperture beam steering electrodes configured to control refraction of the light beam in the first in-plane direction.

The optical waveguide mentioned above can include that the first beam steering portion is configured to provide selectable steering of the light beam to discretely-defined in-plane angular positions in response to a first control signal, and that the second beam steering portion is configured to provide selectable steering of the light beam about the discretely-defined in-plane angular positions in response to a second control signal.

In an example, a method for adjusting an angle of a light beam can include using a beam steering apparatus, the method comprising controllably steering the light beam in a first in-plane direction using a first beam steering portion comprising at least two rows of sub-aperture tapered structures, wherein at least one row amongst the at least two rows of sub-aperture tapered structures is tipped at a first specified in-plane angle relative to another row amongst the at least two rows, the first specified in-plane angle oriented in the first in-plane direction, and controllably steering the light beam in the first in-plane direction using a second beam steering portion comprising full-aperture beam steering elements to refract the light beam in the first in-plane direction.

For example, the method can include that the first beam steering portion is configured to provide adjustment of an in-plane angle of the light beam in angular increments that are coarser than an angular steering resolution provided by the second beam steering portion. In an example, the method can include generating a first control signal electrically coupled to electrode structures comprising the first beam steering portion to provide selectable steering of the light beam to discretely-defined in-plane angular positions, and generating a second control signal electrically coupled to electrode structures comprising the second beam steering portion to provide selectable steering of the light beam about the discretely-defined in-plane angular positions.

Generally, the examples described in this document can be implemented in whole or in part within an integrated circuit package or module. This summary is intended to provide an overview of subject matter of the present patent application. It is not intended to provide an exclusive or exhaustive explanation of the invention. The detailed description is included to provide further information about the present patent application.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

FIG. 4 illustrates generally an illustrative example comprising a non-mechanical beam steerer structure, such as corresponding to the illustrative examples of FIG. 3A and FIG. 3B, and having coarse "zones" corresponding to discrete-defined angular positions, and finer control to scan locations within the zone.

FIG. 5A, FIG. 5B, and FIG. 5C illustrate generally a simplified representation of sub-aperture prism structure having one row of structures tipped with respect to another row, such as generally corresponding to the sub-aperture tapered structures discussed in relation to other examples herein, along with corresponding angles (shown in FIG. 5B) and reference lines (shown in FIG. 5C), from which diffractive losses and be estimated using an analytical model.

DETAILED DESCRIPTION

An optical system can be used to automatically detect objects such as obstacles, including identifying one or more of a distance from the optical system, a spatial location of an object, or an extent of such an object. Various approaches can be used to perform such detection, including illuminating a field-of-regard using either a "flash" or scanned optical transmitter scheme. Light that is reflected or scattered by objects in the field-of-regard can be detected and then processed. In one approach, a non-mechanical beam steerer structure can be used to provide scanning of a light beam for illumination of the field-of-regard. An illumination source such as a laser can be coupled into a planar waveguide forming a portion of the beam steerer. An effective index of refraction corresponding to propagating light within the planar waveguide can be controlled to provide in-plane steering of the light beam. As mentioned above, a combination of sub-aperture and full-aperture beam steering structures can be used (e.g., corresponding to regions of controlled variation in an index of refraction).

Apparatus and techniques described herein can be used to provide controllable steering of the light beam such as by applying control signals to one or more electrode structures (e.g., patterned electrodes). Such structures can establish an electric field within or nearby an electro-optic material. In response, an index of refraction of the electro-optic material can be varied. If the electro-optic material is used to clad at least a portion of the waveguide structure, an effective index of refraction can be varied without having to directly modulate an index of refraction of the material forming the waveguide core in bulk. In particular, sub-aperture tapered structures can be used to provide discretized "coarse" steering. Such tapered structures can be formed in successive rows to provide a series of discrete angular positions to which the light beam can be steered. If one row of such tapered structures is "tipped" (e.g., rotated in plane) with respect to another row, diffractive losses can be reduced as compared to other patterns or configurations. Use of such a tipped configuration can also provide coarse beam steering in discrete angular increments without requiring use of a compensation structure (e.g., a compensation plate).

Figure 1:
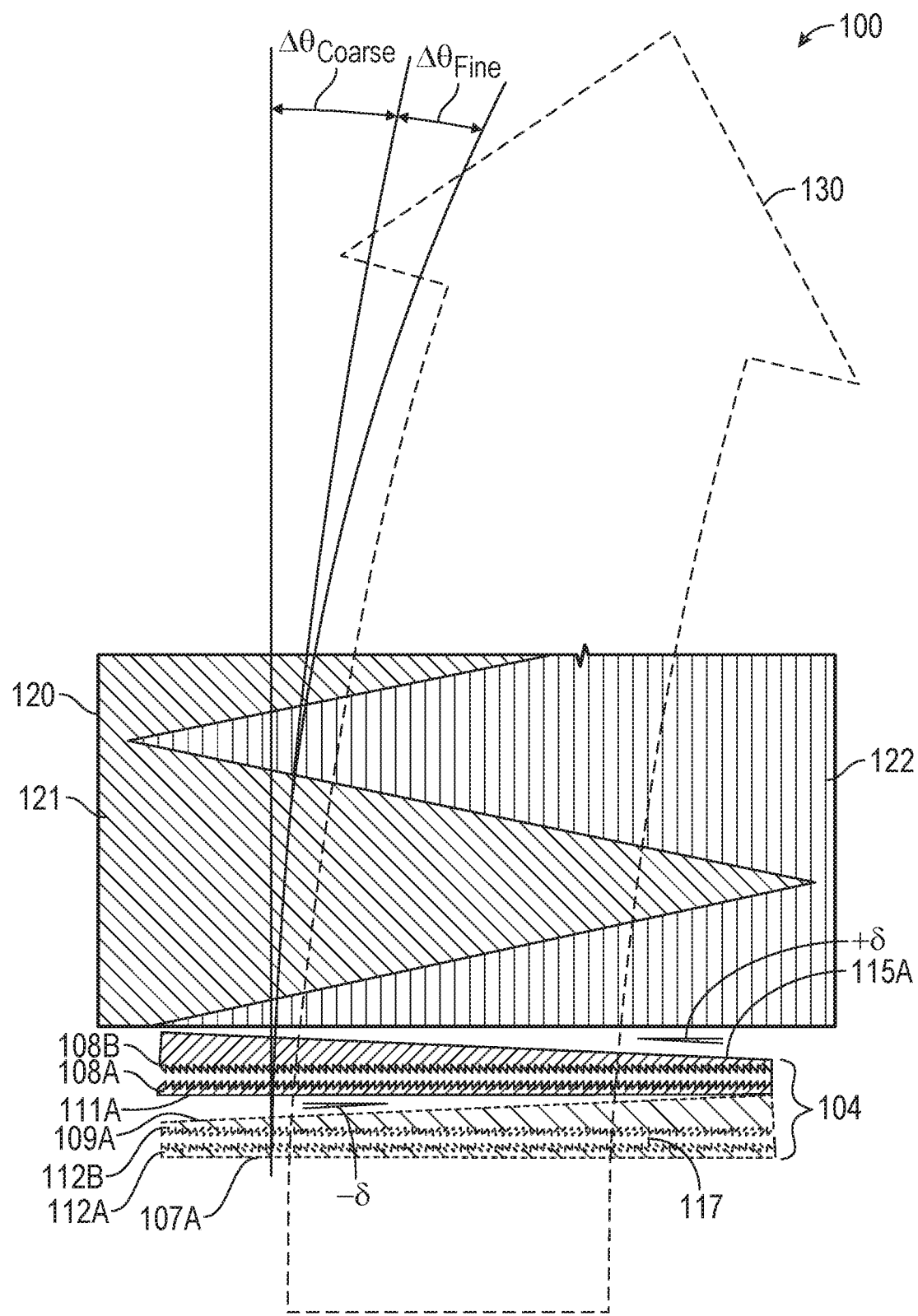
FIG. 1 illustrates generally an illustrative example comprising a configuration of sub-aperture elements and full-aperture elements, such as corresponding to a portion of a non-mechanical beam steerer structure.

FIG. 1 illustrates generally an illustrative example comprising a configuration of sub-aperture tapered structures and full-aperture elements, such as corresponding to a portion of a non-mechanical "hybrid" beam steerer structure 100. The beam steerer structure 100 can include a first beam steering portion 104, comprising tapered sub-aperture structures arranged in respective rows. Such sub-aperture structures can include refractive structures (e.g., prisms) having a triangular or saw-tooth shape as shown illustratively in FIG. 1, such as forming a blazed structure. The steering that can be provided by the sub-aperture structures interacting with a light beam 130 is diffractive in nature.

As mentioned elsewhere herein, the sub-aperture tapered structures can include a first row 112A of such structures, such as interconnected by a base region having a base region edge 107A. In operation, a light beam 130 can propagate in a manner such that the first row 112A receives light at the base region edge 107A and provides light toward distal peaks of tapered structures comprising the first row 112A. A second row 112B an receive light at peaks of tapered structures comprising the second row 112B, the tapered structures comprising the second row arranged having peaks facing corresponding distal peaks of the first row, such as shown at 117 (illustrating two opposing peaks of respective ones of the sub-aperture tapered structures comprising the first row 112A and the second row 112B). The second row 112B can be tipped (e.g., rotated in the in-plane direction) at a first specified in-plane angle (e.g., "δ") relative to the first row. Such tipping can also include a base region edge 109A of the second row that is tipped relative to a first base region edge 107A of the first row. Such tipping of the second row 112B relative to the first row 112A can cause a distance between base region edges 107A and 109A to be tapered across a lateral width of the first and second rows 112A and 112B while maintaining a constant distance between facing distal tips of the tapered structures, such as shown at 117.

The beam steered structure 100 can include second beam steering portion 120, such as comprising full-aperture refractive elements. The beam steering provided by the second beam steering portion 120 can be considered refractive in nature. For example, as shown in FIG. 1, the full-aperture refractive elements can include a first arrangement of full-aperture refractive elements 121 and a second arrangement of full-aperture refractive elements 122. In operation, a light beam 130 having a lateral width as shown illustratively in FIG. 1 can be incident upon the first beam steering portion 104. The first beam steering portion 104 can be used to controllably adjust an in-plane angle of the light beam 130 by a discrete angular increment, "$\Delta\theta_{coarse}$" (e.g., plus or minus a few degrees, such as corresponding to the in-plane tilt angle, θ). The continuous beam steering portion 120 can adjust an angle of the light beam 130, such as continuously (or at least in finer angular increments than the coarse angular increment, $\Delta\theta_{coarse}$) through an angular range $\Delta\theta_{fine}$ (e.g., an angle in the range of plus or minus one degree, for example). In the example shown in FIG. 1, the first and second rows 112A and 112B of the first beam steering portion 104 can steer the light in a first in-plane direction. While a lateral width of the light beam 130 is mentioned, such a lateral width or extent can refer to a light beam diameter 130, a light beam 130 peripheral outline, or other cross-sectional dimension ("beamwidth") of the light beam 130 considering a range of positions over which the light beam 130 travels. For example, the light beam 130 may be obliquely incident upon a particular portion of the sub-aperture tapered structure, such that an effective beamwidth of the obliquely incident beam peripheral outline may be larger than the effective beamwidth of the beam diameter taken cross-sectionally perpendicular to the beam.

A third row 108A and a fourth row 108B can be included, such as to provide beam steering in an in-plane direction opposite the first and second rows 112A and 112B. In a manner similar to the first and second rows 112A and 112B, the fourth row 108B can be tipped relative to the third two 108A. The third row 108A can define a third base region edge edge 111A, and the fourth row 108B can define a fourth base region edge 115A that is tipped relative to the third base region edge 111A. Accordingly, the third and fourth rows 108A and 108B can provide beam steering that can adjust the light beam 130 by a discrete angular increment, $-\Delta\theta_{coarse}$. Similarly, the first arrangement of full-aperture refractive elements 121 of the second beam steering portion can steer the light beam 130 in a first in-plane direction, and the second arrangement of full-aperture refractive elements 122 can steer the light beam 130 in the second in-plane direction opposite the first in-plane direction. In this manner, either one or both the first beam steering portion 104 or the second beam steering portion 120 can provide bi-directional beam steering in-plane (e.g., in the plane of a planar waveguide structure, corresponding to the plane of the drawing sheet of FIG. 1).

As shown in FIG. 1, a lateral width of the light beam 130 encompasses multiple sub-aperture tapered structures (e.g., saw tooth or triangular prisms in the first beam steering portion 104), but the light beam 130 is entirely within the lateral extent of the full-aperture triangular structures comprising the second beam steering portion 120. Generally, the arrangements of beam steering structures shown in FIG. 1 can be implemented using electrode arrangements as shown and described elsewhere herein, such as to controllably adjust an index of refraction of an electro-optic material cladding a waveguide core. As an illustrative example, the structures shown and described herein can be used to provide beam steering for coherent (e.g., laser light) at a wavelength of about 1550 nanometers.

Figure 2A:
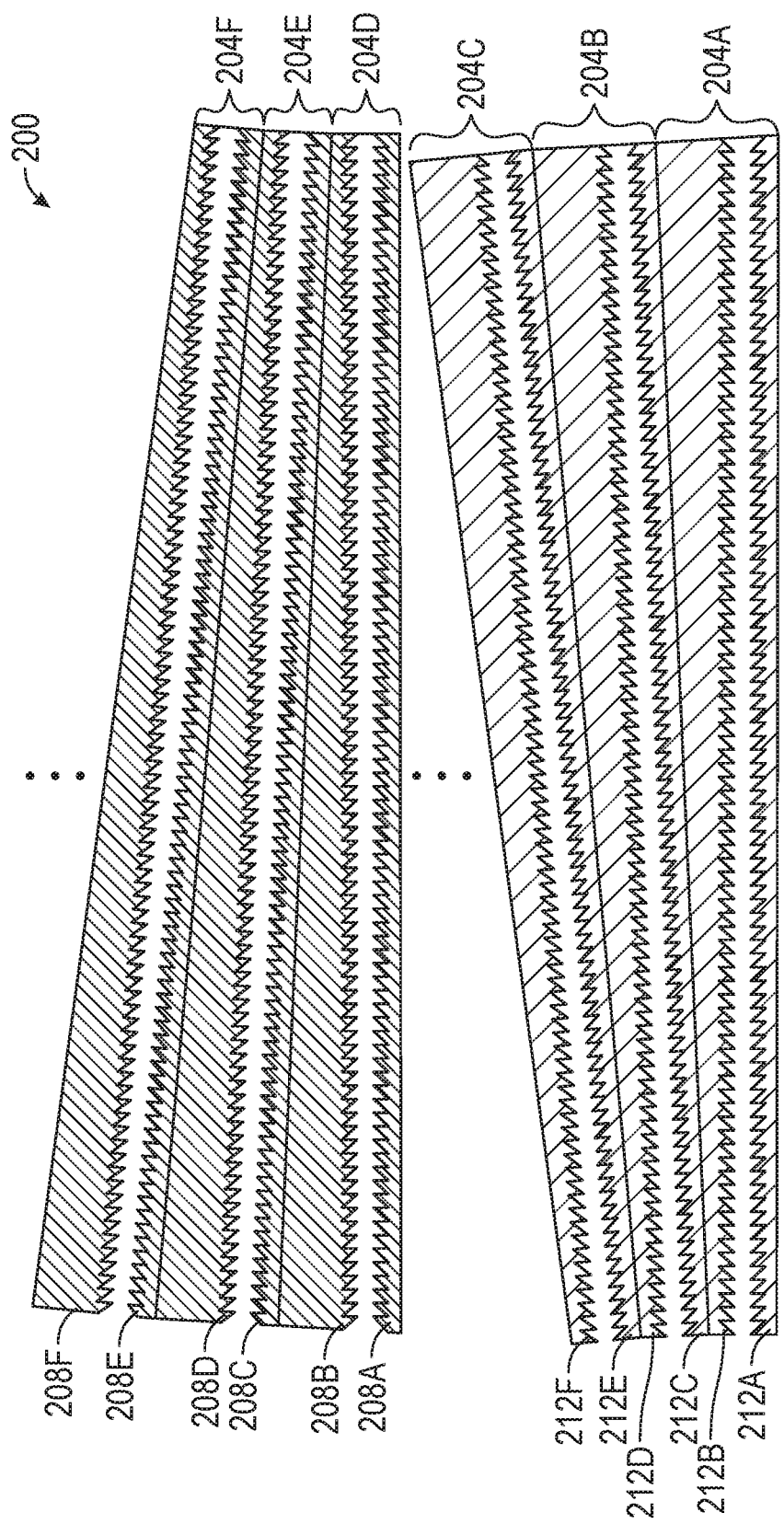
FIG. 2A illustrates generally an illustrative example comprising another configuration of sub-aperture elements corresponding to a portion of a non-mechanical beam steerer structure.
Figure 2B:
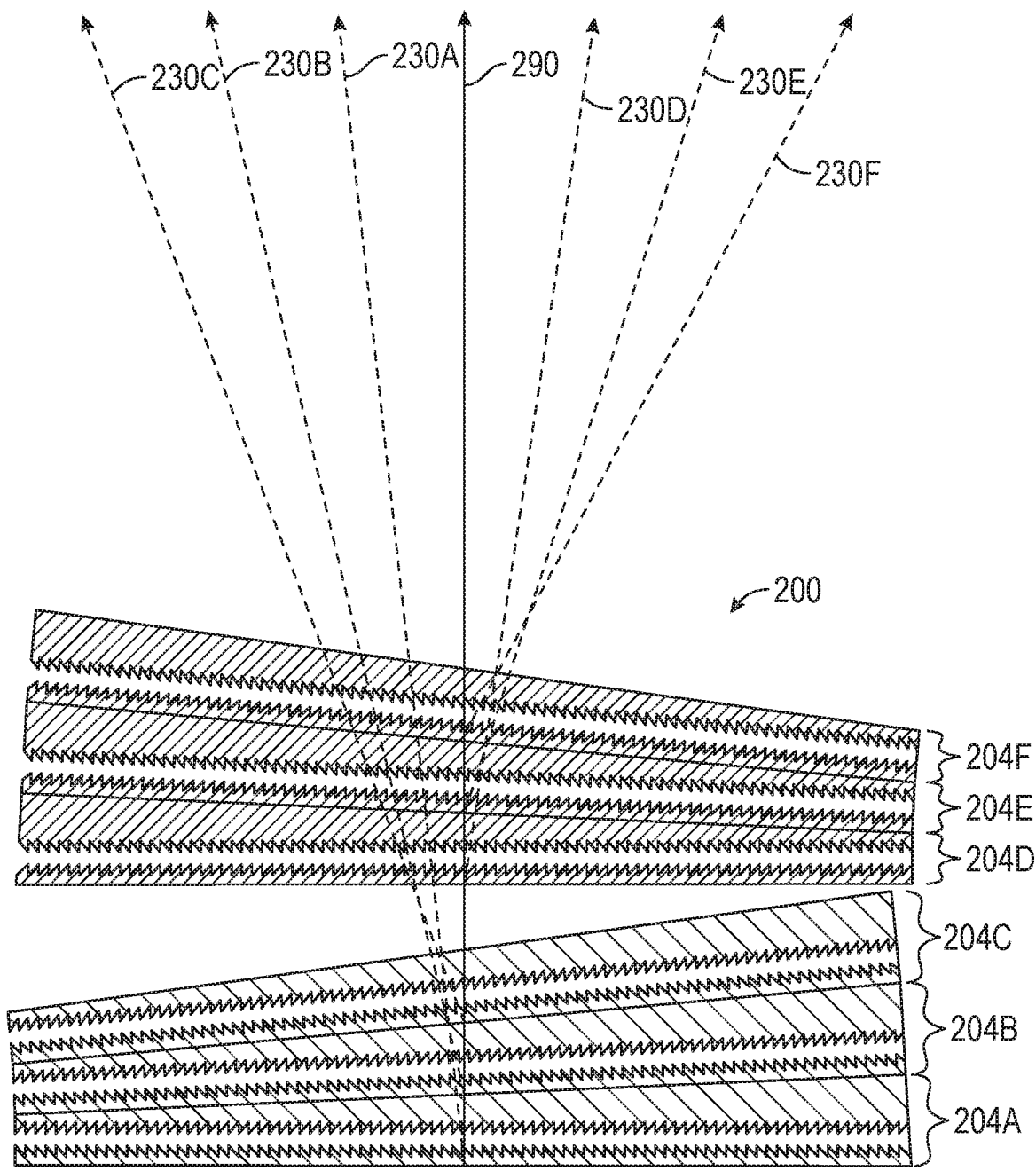
FIG. 2B illustrates generally a relationship between discretely-defined in-plane angular positions and corresponding sub-aperture elements that can be used to steer a light beam.

FIG. 2A illustrates generally an illustrative example comprising another configuration 200 of sub-aperture elements corresponding to a portion of a non-mechanical beam steerer structure. The configuration 200 shown in FIG. 2A can correspond to regions having a controllable index of refraction that differs from a surrounding region, such as to create structures having controllable refractive properties. In FIG. 2A, respective rows 212A, 212B, 212C, 212D, 212E, and 212F are grouped into pairs of rows having opposing sub-aperture tapered structures (e.g., distal tips of triangular or saw-toothed prism structures are oriented facing each other in the respective pairs, and one row is tipped (rotated in an in-plane direction) relative to an adjacent row amongst the facing pairs of rows). Each of the pairs of rows 204A, 204B, 204C, 204D, 204E, and 204F can include respective distal base edges that are also tipped (e.g., rotated in an in-plane direction) with respect to the preceding row. The pairs of rows 204A, 204B, and 204C are tipped in a first in-plane direction, such as to provide steering in discrete angular increments corresponding to each pair of rows 204A, 204B, and 204C as shown in FIG. 2B. Beam steering in an opposite in-plane direction can be performed by pairs of rows 204D, 204E, and 204F, which can be arranged in a mirror-image of the configuration of rows 204A, 204B, and 204C. Pairs of rows can be removed or added to the configuration 200 shown in FIG. 2A, such as to provide fewer or greater discrete angular increments, such as for coarse steering as shown illustratively in FIG. 1, FIG. 2B, or FIG. 4.

FIG. 2B illustrates generally a relationship between discretely-defined in-plane angular positions and corresponding sub-aperture elements that can be used to steer a light beam. As in FIG. 2A, a configuration 200 of sub-aperture tapered elements. A first pair of rows 204A can controllably steer a light beam toward a first discrete angular position 230A. For example, if an electrode arrangement is formed corresponding to the configuration 200 of the first pair of rows 204A, such an electrode arrangement can be energized to establish an electric field profile in an electro-optic material corresponding to the shape of the first pair of rows 204A. When such an electrode arrangement is active, a light beam can be steered in an in-plane direction toward the first discrete angular position 230A, such as corresponding to a specified diffractive order when a pitch (a spacing of the sub-aperture prisms such as a spacing between distal tips) is established such that an angle of a sub-aperture portion of the light beam steered by a respective one of the sub-aperture tapered structures corresponds to an angle of the first diffractive order. Generally, the blazing condition is satisfied for a specified pitch and control voltage applied to the electrode structure. Similarly, the second pair of rows 204B can be used to steer the light beam to a second discrete angular position 230B, and so on (e.g., a third pair of rows 204C, when present, can be used to steer the light beam to a third discrete angular position 230C, etc.). To provide steering in the opposite in-plane direction, the third pair of rows 204D, fourth pair of rows 204E, and fifth pair of rows 204F can be used to steer the light beam to corresponding discrete angular positions 230D, 230E, or 230F, respectively. If the configuration 200 of sub-aperture tapered regions is inactive (e.g., de-energized if formed by an electrode arrangement or otherwise controlled to remove variations in an index of refraction corresponding to the configuration 200), the light beam can propagate along a neutral axis 290, such as a bisector of a planar waveguide structure.

Figure 3A:
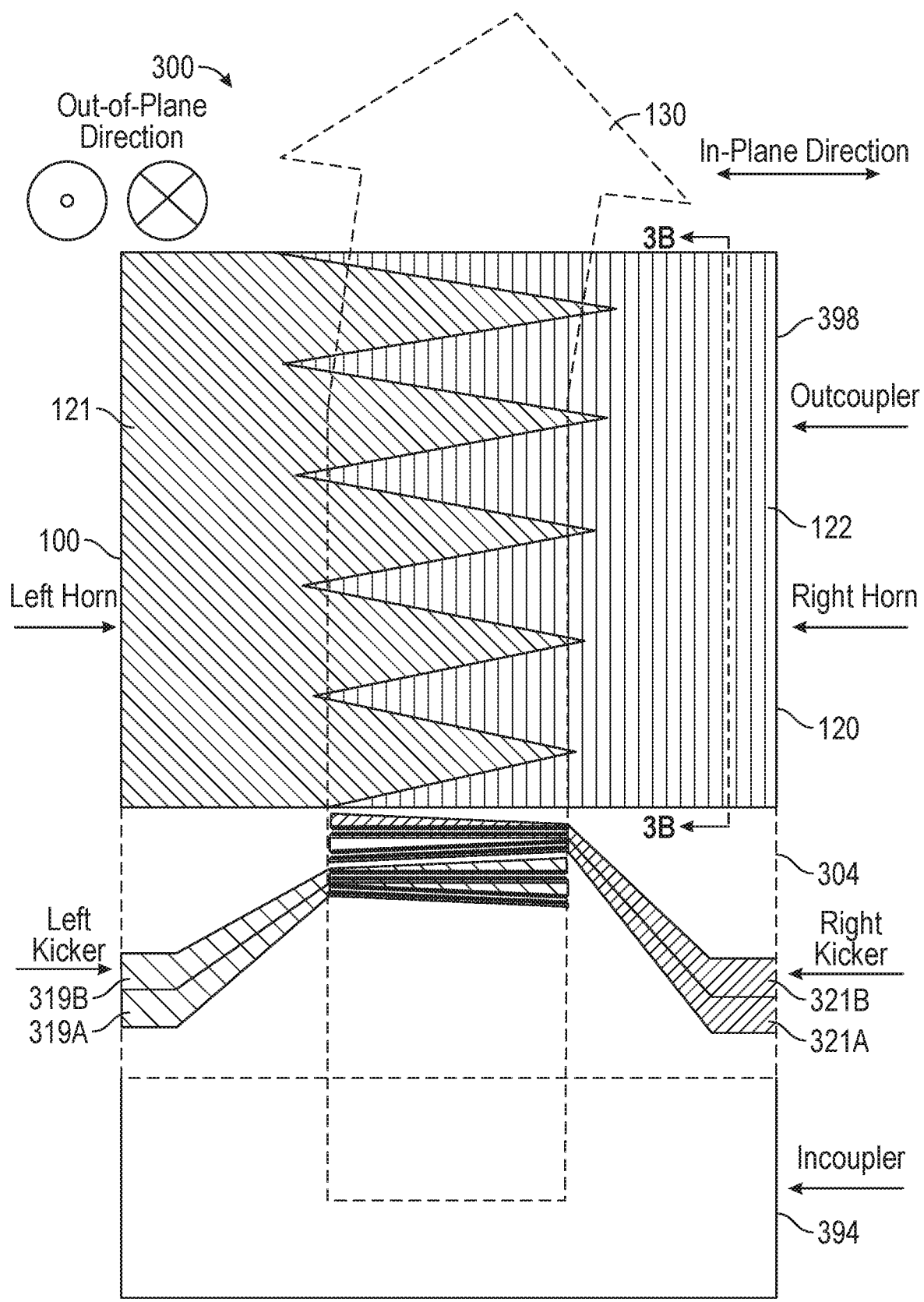
FIG. 3A illustrates generally an illustrative example comprising a plan view of liquid crystal waveguide (LCW) structure, such as can be used to provide non-mechanical steering of a light beam.

FIG. 3A illustrates generally an illustrative example comprising a plan view of liquid crystal waveguide (LCW) structure 300, such as can be used to provide non-mechanical steering of a light beam 130. The LCW structure 300 can include various regions, such as an incoupler region 394, and beam steering portions as mentioned in relation to other examples herein. For example, the beam steering structure 100 can include first beam steering portion 304 comprising sub-aperture tapered structures (e.g., comprising rows of prism gratings as shown and described in relation to other examples).

A second beam-steering portion 120 can include full-aperture elements. As an illustrative example, FIG. 3A illustrates a left "kicker" beam steering portion such as having electrode arrangements coupled to conductive regions 319A and 319B, and a right "kicker" beam steering portion having electrode arrangements coupled to conductive regions 321A and 321B. The second beam steering portion 120 can have a left horn configuration 121 and a right horn configuration 122. In an example, the first beam steering portion 304 can provide control over the light beam direction 130 in discrete angular increments in-plane, and the second beam steering portion 120 can provide control over the light beam direction in over a relatively finer (e.g., continuous) range of angles. The light beam 130 can be outcoupled from the LCW structure 300 in an outcoupler region 398. One or more electrodes or other structures can be used, such as to provide controllable incoupling or outcoupling of light in the incoupler region 394 or the outcoupler region 398. For example, the incoupler region 394 can use one or more of an evanescent or diffractive incoupling effect to incouple the light beam 130 into a waveguide core of the LCW structure 300. Similarly, the outcoupler region 398 can use one or more of an evanescent or diffractive outcoupling effect to outcouple the light beam 130 from the waveguide core of the LCW structure 300. In an example, the outcoupler region 398 (or another portion of the LCW structure 300) can be used to provide beam steering in an out-of-plane direction.

Figure 3B:
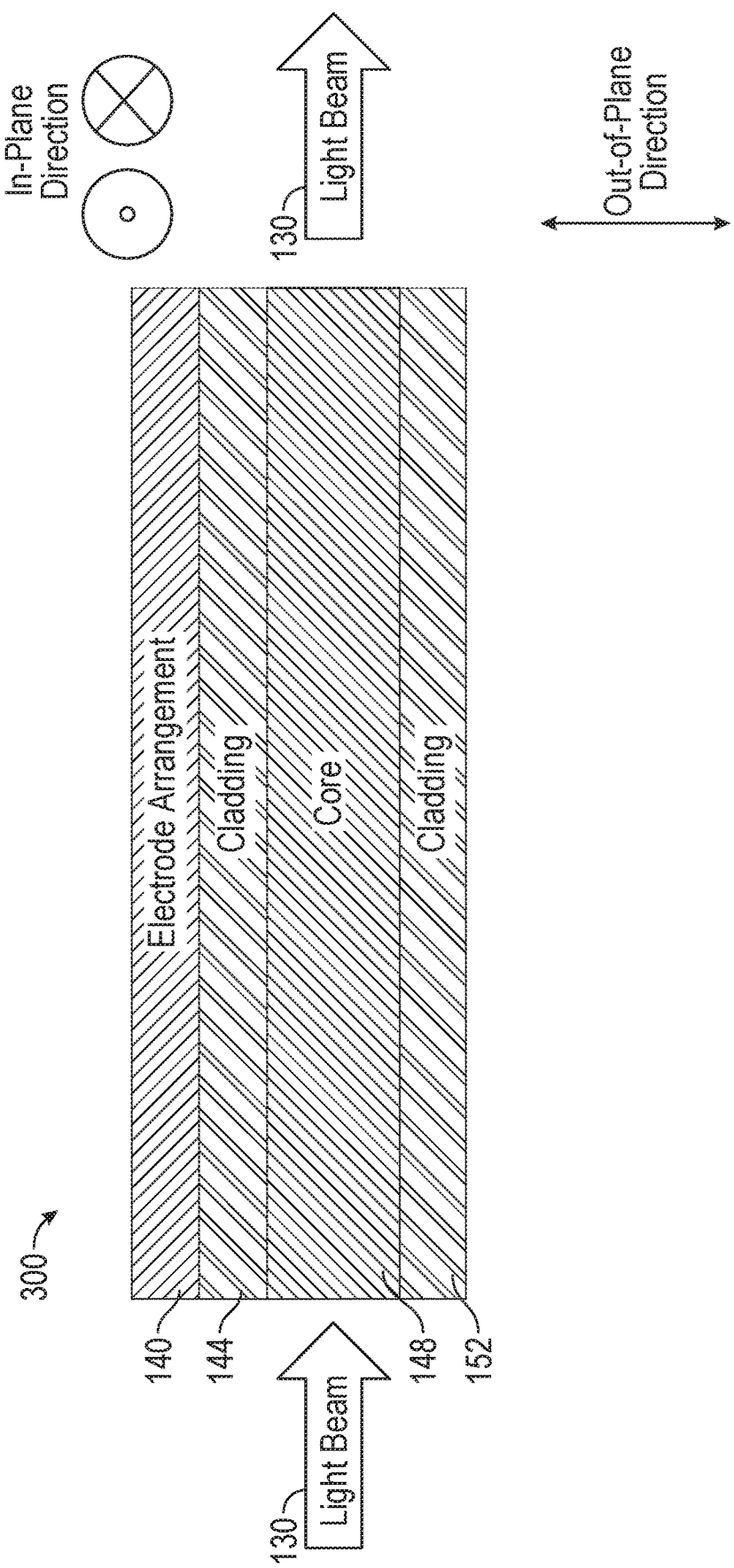
FIG. 3B illustrates generally an illustrative example comprising a layer stack-up of a portion of the LCW structure shown in FIG. 3A, where an electrode arrangement 140 can be patterned to define corresponding full-aperture or sub-aperture regions having a controllable index of refraction.

FIG. 3B illustrates generally an illustrative example comprising a layer stack-up of a portion of the LCW structure 300 shown in FIG. 3A, where an electrode arrangement 140 can be patterned to define corresponding full-aperture or sub-aperture regions having a controllable index of refraction. The LCW structure 300 can include a first cladding 144, a waveguide core 148, and a second cladding 152. During operation, the light beam 130 can be guided through the waveguide core 148. In response to a control signal (e.g., an applied voltage) imposed on specified portions of the electrode arrangement 140, a pattern of refractive shapes (e.g., regions having an index of refraction contrasting with other regions of the cladding 144 or waveguide core 148) can be formed in the first cladding 144, when the first cladding 144 includes an electro-optic material. The pattern of refractive shapes generally corresponds the same as the shape of the electrode arrangement 140. In this manner, the refractive shapes formed in the first cladding 144 can adjust an in-plane angle of the light beam guided through the waveguide core 148 as described in relation to other examples herein. As an illustrative example, the first cladding 144 can include a liquid crystal material and applied voltages to the electrode arrangement 140 can provide a change in the refractive index of the liquid crystal material, such as to establish refractive structures in the first cladding 144 that correspond to a shape of the electrode arrangement 140. At least a portion of the waveguide core 148 or the second cladding 152 can be electrically conductive, such as to provide a counter electrode. Such a counter electrode can help to establish a uniform electric field profile vertically across the cladding material when electrodes comprising the electrode arrangement 140 are energized. Illustrative (but non-limiting) examples of waveguide structures (e.g., LCW structures similar to those discussed above in relation to FIG. 3A or FIG. 3B, or other examples herein) can be found in (1) U.S. Pat. No. 10,133,083; (2) U.S. Pat. No. 10,120,261; (3) U.S. Pat. Nos. 9,366,938, 9,885,892, 9,829,766, and 9,880,443; (4) U.S. Pat. Nos. 8,311,372 and 8,380,025; (5) U.S. Pat. No. 8,860,897; (6) U.S. Pat. No. 8,463,080; and (7) U.S. Pat. No. 7,570,320, all of which are incorporated herein by reference in their entireties, including for their description of LCWs and uses such as for beam steering of light, including in-plane and out-of-plane beam steering. The patterns or electrode configurations described in this document can be applied to such LCW structures, such as without requiring use of a compensation plate.

FIG. 4 illustrates generally an illustrative example comprising a non-mechanical beam steerer structure, such as corresponding to the illustrative examples of FIG. 3A and FIG. 3B, and having coarse "zones" corresponding to discretely-defined angular positions, and finer control to scan locations within the zone. In FIG. 4, an LCW structure 300, such as described in relation to other examples herein, can receive a light beam 430 such as from a laser or other light source. The LCW structure 300 can provide beam steering in an in-plane direction. Such in-plane steering can include coarse steering to one more angular regions (e.g., Zone 1, Zone 2, Zone 3, Zone 4, or Zone 5), such as using sub-aperture tapered structures in a first beam steering portion of the LCW structure 300. Finer steering about the zones can be performed in an in-plane direction using a second beam steering portion having full-aperture refractive structures as mentioned elsewhere herein. Out-of-plane steering can be performed such as using a separate out-of-plane beam steering structure, either included as a portion of the LCW structure 300 or using a separate mechanical or non-mechanical steerer. In this manner, an output beam can be steered from a first location 430A to a second location 430B to illuminate specified portions of a field-of-regard. Such scanning can be performed in a raster or sequential manner, or such scanning can be controlled according to another scheme, such as incorporating more coarse or more fine scanning as needed for particular applications or conditions. For example, such scanning can be performed rapidly at a coarse angular resolution to interrogate a field-of-regard, and one or more detected objects can be scanned at finer angular resolution for purposes of tracking, once such objects are identified.

FIG. 5A, FIG. 5B, and FIG. 5C illustrate generally a simplified representation of sub-aperture prism structure having one row of structures tipped with respect to another row, such as generally corresponding to the sub-aperture tapered structures discussed in relation to other examples herein, along with corresponding angles (shown in FIG. 5B) and reference lines (shown in FIG. 5C), from which diffractive losses and be estimated using an analytical model. In FIG. 5A, a light beam 130 can interact with a first grating structure comprising a row of sub-aperture tapered structures 512A, and portions of the light beam can be diffracted to corresponding faces of a second row of sub-aperture tapered structures 512B, as discussed in relation to other examples herein. In FIG. 5A, diffractive loss occurs when portions the incoming light beam are "shadowed" by failing to hit the correct output facet of the steering prism. In FIG. 5A, FIG. 5B, and FIG. 5C, "δ" can represent a total angle steered by the two rows of tapered structures (e.g., comprising structures 512A or 512B). An angle of the prism can be represented by $\theta_p$, and $w_p$ can represent a pitch (a distance between corresponding points on the prisms defining spacing of the prisms). The distance $w_s$ can represent a width of a portion of the light beam that is shadowed or does not otherwise properly couple to a face of the prism structures. Vectors can be defined corresponding to the lines "A" and "B." For example, a vector $\vec{r}_B$ can be defined, ending at a location where a marginal steered ray hits the correct face of the upper row 512B:

$$\vec{r}_B = w_p \tan\theta_p (\sin 2\delta, \cos 2\delta).$$

Similarly, a vector $\vec{r}_A$ can be defined, which ends at the location where the marginal steered ray would hit if there were no unwanted face on the upper row:

$$\vec{r}_A = \frac{w_P}{\cos\theta_P}(\cos\theta_P - \cos(\theta_P + 2\delta), \sin(\theta_P + 2\delta)).$$

A vector difference between these locations can be defined as follows:

$$\vec{\Delta r_{AB}} = \vec{r}_A - \vec{r}_B = w_P(1-\cos 2\delta, \sin 2\delta),$$

and a corresponding diffractive loss can then be estimated using the following expression:

$$\text{diffractive loss} \sim \frac{w_S}{w_P} = \left|\frac{\vec{e_{2\delta}} \times \vec{\Delta r_{AB}}}{\cos 2\delta}\right| = \frac{1}{\cos 2\delta} - 1.$$

Unlike other sub-aperture configurations, the loss fraction above can be considered to scale with $\delta^2$, assuming that δ is relatively small. As an illustrative example, for a configuration equivalent to the one shown in FIG. 5A (e.g., δ=0.82° and $\theta_p$=45°), $$\frac{w_S}{w_P} = 0.0410\%.$$

Accordingly, the configuration shown in FIG. 5A (corresponding to other examples herein) can provide shadowing diffractive losses that are reduced by about two orders of magnitude as compared to other approaches (e.g., approaches lacking a tipped structure as shown and described herein).

Figure 6A:
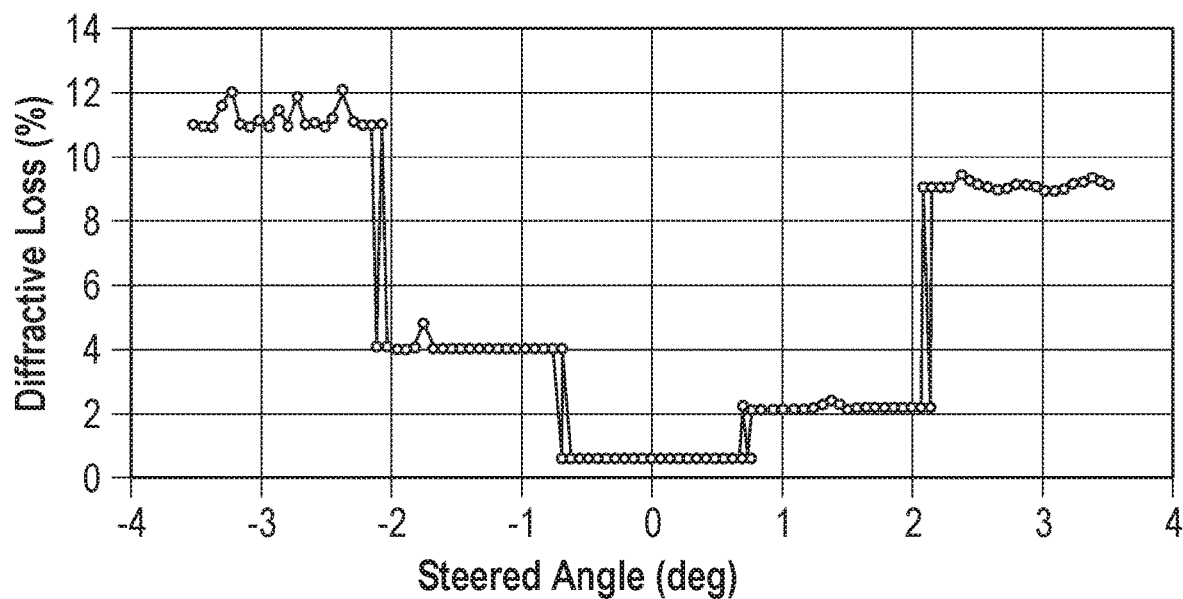
FIG. 6A illustrates generally an illustrative example of simulated diffractive losses for a sub-aperture beam steering structure where adjacent rows of opposing saw-tooth prisms are not tipped with respect to each other.
Figure 6B:
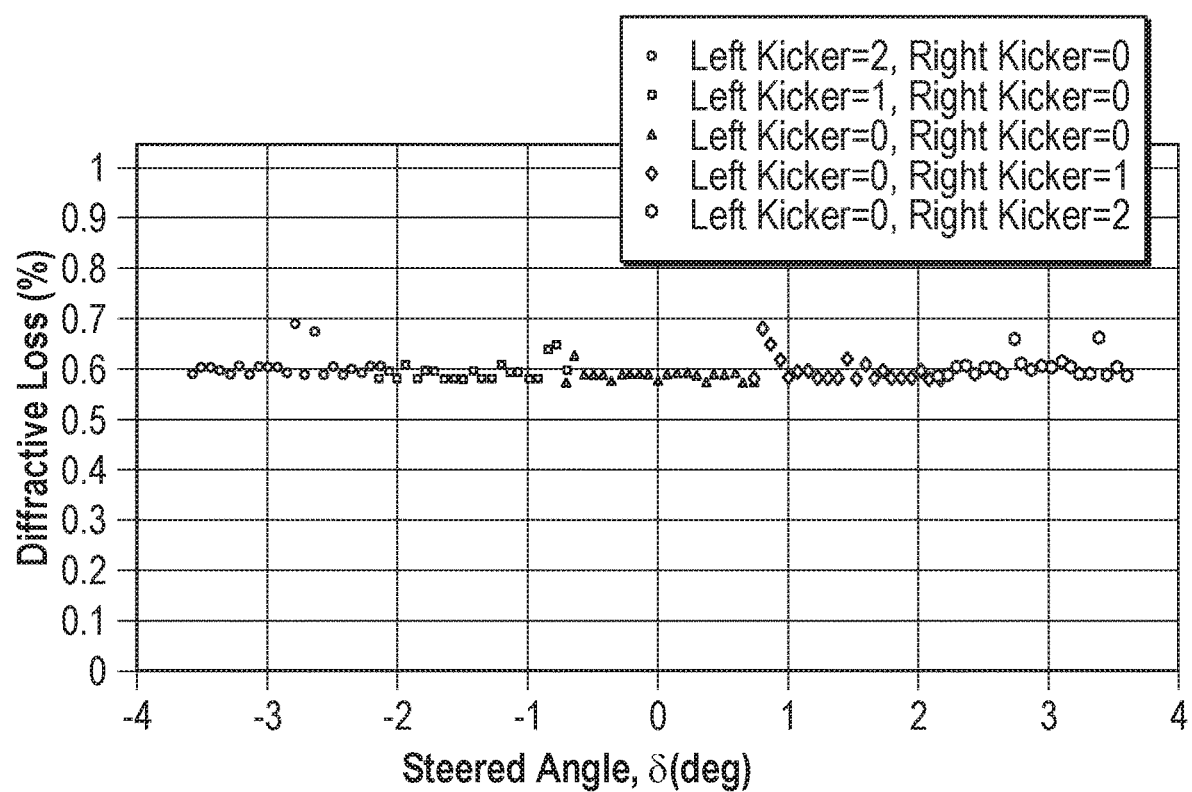
FIG. 6B illustrates generally an illustrative example of simulated diffractive losses for a sub-aperture beam steering structure where adjacent rows of opposing saw-tooth prisms are tipped with respect to each other, such as shown illustratively in the example of FIG. 2A.

FIG. 6A illustrates generally an illustrative example of simulated diffractive losses for a sub-aperture beam steering structure where adjacent rows of opposing saw-tooth prisms are not tipped with respect to each other, and for purposes of comparison, FIG. 6B illustrates generally an illustrative example of simulated diffractive losses for a sub-aperture beam steering structure where adjacent rows of opposing saw-tooth prisms are tipped with respect to each other, such as shown illustratively in the examples of FIG. 1, FIG. 2A, FIG. 2B, and FIG. 5A. Generally, the sub-aperture tapered structures described herein can provide diffractive loss percentages that are an order of magnitude lower than the values shown in FIG. 6A.

Figure 7:
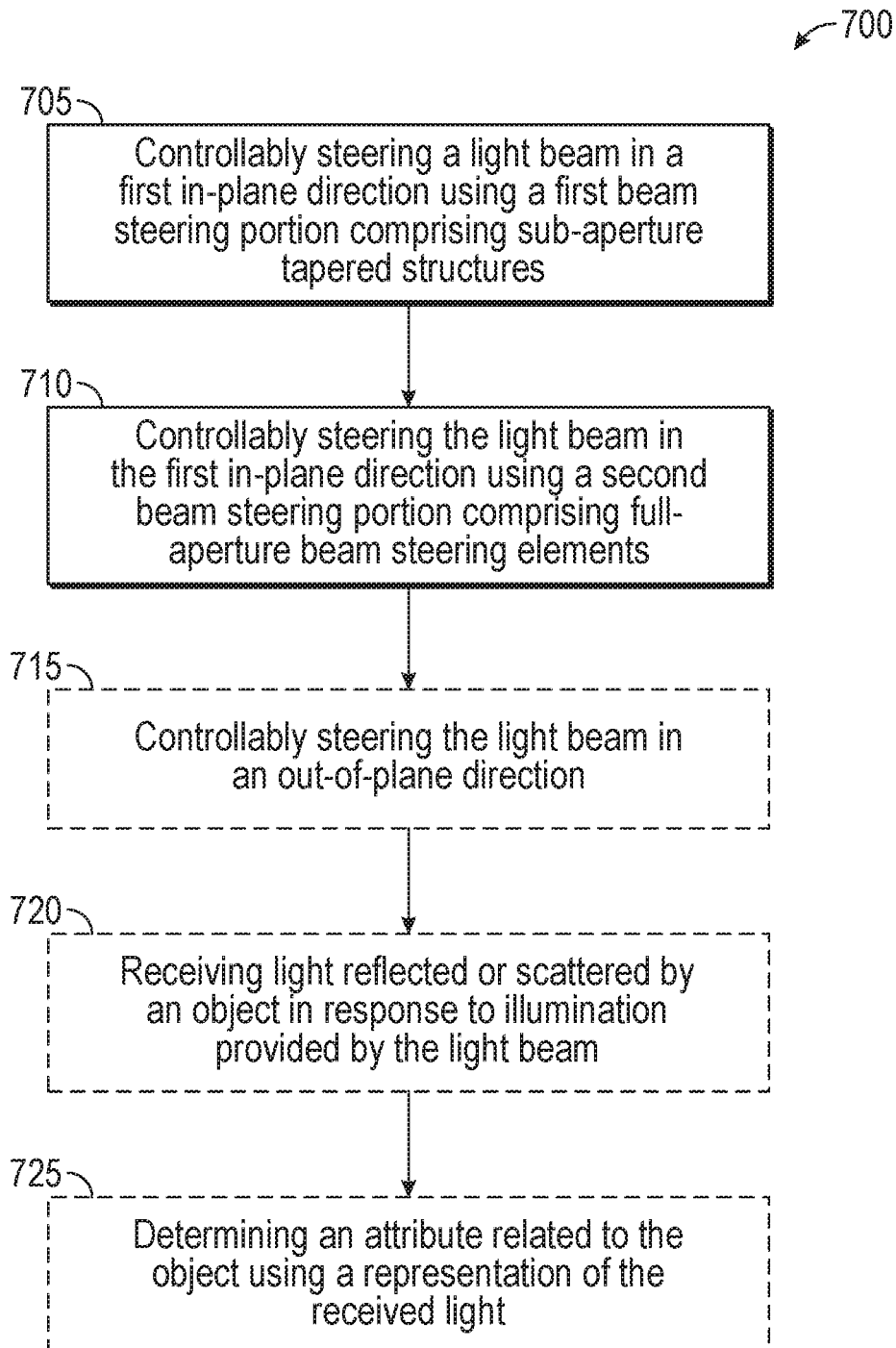
FIG. 7 illustrates generally a technique, such as a method, that can include controllably steering a light beam using sub-aperture tapered structures and full-aperture elements, such as shown illustratively in other examples herein.

FIG. 7 illustrates generally a technique, such as a method, that can include controllably steering a light beam using sub-aperture tapered structures and full-aperture elements, such as shown illustratively in other examples herein. At 705, the light beam can be controllably steered in a first in-plane direction using a first beam steering portion. The first beam steering portion can include sub-aperture tapered structures. At 710, the light beam can be controllably steered in the first in-plane direction using a second beam steering portion comprising full-aperture beam steering elements. Optionally, at 715, the light beam can be steered in an out-of-plane direction, such as to facilitate scanning of a light beam in two axes to illuminate a field-of-regard. Optionally, at 720, light reflected or scattered by an object illuminated by the light beam can be received. For example, optionally, at 725, an attribute can be determined related to the object such as using a representation of the received light. For example, such attributes can include one or more of automatically determining a distance between the object and the optical system illuminating the object with the steered light beam, or a spatial location of the object with respect to an absolute or relative coordinate system. Beam steering techniques as shown and described herein can be used to sequentially illuminate locations in a field-of-regard or a beam can be steered in a random-access manner, such as by providing time-varying control signals to modulate an electric field in an electro-optic material cladding a waveguide core.

Each of the non-limiting aspects in this document can stand on its own, or can be combined in various permutations or combinations with one or more of the other aspects or other subject matter described in this document.

The above detailed description includes references to the accompanying drawings, which form a part of the detailed description. The drawings show, by way of illustration, specific embodiments in which the invention can be practiced. These embodiments are also referred to generally as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In the event of inconsistent usages between this document and any documents so incorporated by reference, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

Method examples described herein can be machine or computer-implemented at least in part. Some examples can include a computer-readable medium or machine-readable medium encoded with instructions operable to configure an electronic device to perform methods as described in the above examples. An implementation of such methods can include code, such as microcode, assembly language code, a higher-level language code, or the like. Such code can include computer readable instructions for performing various methods. The code may form portions of computer program products. Further, in an example, the code can be tangibly stored on one or more volatile, non-transitory, or non-volatile tangible computer-readable media, such as during execution or at other times. Examples of these tangible computer-readable media can include, but are not limited to, hard disks, removable magnetic disks, removable optical disks (e.g., compact disks and digital video disks), magnetic cassettes, memory cards or sticks, random access memories (RAMs), read only memories (ROMs), and the like.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description as examples or embodiments, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

The claimed invention is:

1. A beam steering apparatus for adjusting an angle of a light beam, the beam steering apparatus comprising:
   a first beam steering portion comprising at least two rows of sub-aperture tapered structures configured to controllably steer the light beam in a first in-plane direction using an adjustable index of refraction, wherein at least one row amongst the at least two rows of sub-aperture tapered structures is tipped at a first specified in-plane angle relative to another row amongst the at least two rows, the first specified in-plane angle oriented in the first in-plane direction; and
   a second beam steering portion comprising full-aperture beam steering elements to controllably refract the light beam in the first in-plane direction using an adjustable index of refraction.

2. The beam steering apparatus of claim 1, wherein the first beam steering portion comprises at least one row of the sub-aperture tapered structures that is tipped at a second specified in-plane angle with respect to another row amongst the at least two rows, the second specified in-plane angle corresponding to a second in-plane direction opposite the first in-plane direction.

3. The beam steering apparatus of claim 1, wherein the full-aperture beam steering elements of the second beam steering portion are configured to controllably refract the light beam in the first in-plane direction and in a second in-plane direction opposite the first in-plane direction.

4. The beam steering apparatus of claim 1, wherein the first beam steering portion is configured to provide discrete adjustment of an in-plane angle of the light beam in increments that are coarser than an angular steering resolution provided by the second beam steering portion.

5. The beam steering apparatus of claim 4, wherein the first beam steering portion is configured to provide selectable steering of the light beam to discretely-defined in-plane angular positions in response to a first control signal; and
wherein the second beam steering portion is configured to provide selectable steering of the light beam about the discretely-defined in-plane angular positions in response to a second control signal.

6. The beam steering apparatus of claim 1, wherein at least two adjacent rows amongst the at least two rows of sub-aperture tapered structures comprise a pair of rows comprising:
a first row arranged to receive light at interconnected sub-aperture tapered structures comprising the first row, and to provide light toward a direction of distal peaks of tapered structures comprising the first row; and
a second row arranged to receive light from a direction of peaks of tapered structures comprising the second row, the tapered structures comprising the second row arranged having peaks facing corresponding distal peaks of the first row;
wherein a distance between respective facing distal peaks varies according to the specified in-plane angle.

7. The beam steering apparatus of claim 6, wherein the at least two rows comprise multiple pairs of rows.

8. The beam steering apparatus of claim 7, wherein the at least two rows comprise a first pair of rows and a second pair of rows, the second pair of rows tipped at the first specified in-plane angle relative to the first pair of rows.

9. The beam steering apparatus of claim 1, wherein the sub-aperture tapered structures have a pitch such that an angle of a sub-aperture portion of the light beam steered by a respective one of the sub-aperture tapered structures corresponds to an angle of a diffractive order of a row of the sub-aperture tapered structures comprising the respective one.

10. The beam steering apparatus of claim 1, comprising:
a waveguide core configured to guide the light beam along a length of a waveguide; and
a cladding including an electro-optic material, the cladding configured to interact with a portion of the light beam guided by the waveguide;
wherein the first beam steering portion comprises electrodes defining the sub-aperture tapered structures.

11. The beam steering apparatus of claim 10, wherein the second beam steering portion comprises electrode defining the full-aperture beam steering elements.

12. An optical waveguide for performing beam steering of a light beam, the optical waveguide comprising:
a waveguide core configured to guide the light beam along a length of a waveguide;
a cladding including an electro-optic material, the cladding configured to interact with a portion of the light beam guided by the waveguide;
an electrode arrangement configured to adjust an angle of the light beam in an in-plane direction by adjusting an index of refraction of the electro-optic material, wherein the electrode arrangement comprises:
a first beam steering portion comprising at least two rows of sub-aperture tapered electrodes configured to control steering the light beam in a first in-plane direction, wherein at least one row amongst the at least two rows of sub-aperture tapered structures is tipped at a first specified in-plane angle relative to a another row amongst the at least two rows, the first specified in-plane angle oriented in the first in-plane direction; and
a second beam steering portion comprising full-aperture beam steering electrodes configured to control refraction of the light beam in the first in-plane direction.

13. The optical waveguide of claim 12, wherein the full-aperture beam steering electrodes of the second beam steering portion are configured to control refraction of the light beam in the first in-plane direction and in a second in-plane direction opposite the first in-plane direction.

14. The optical waveguide of claim 12, wherein the first beam steering portion is configured to provide selectable steering of the light beam to discretely-defined in-plane angular positions in response to a first control signal; and
wherein the second beam steering portion is configured to provide selectable steering of the light beam about the discretely-defined in-plane angular positions in response to a second control signal.

15. The optical waveguide of claim 12, wherein at least two adjacent rows amongst the at least two rows of sub-aperture tapered electrodes comprise a pair of rows comprising:
a first row arranged to receive light at interconnected sub-aperture tapered electrodes comprising the first row, and to provide light toward a direction of distal peaks of tapered electrodes comprising the first row; and
a second row arranged to receive light from a direction of peaks of tapered electrodes comprising the second row, the tapered electrodes comprising the second row arranged having peaks facing corresponding distal peaks of the first row;
wherein a distance between respective facing distal peaks varies according to the specified in-plane angle.

16. The optical waveguide of claim 12, wherein the at least two rows comprise multiple pairs of rows; and
wherein the at least two rows comprise a first pair of rows and a second pair of rows, the second pair of rows tipped at the first specified in-plane angle relative to the first pair of rows.

17. A method for adjusting an angle of a light beam using a beam steering apparatus, the method comprising:
controllably steering the light beam in a first in-plane direction using a first beam steering portion comprising at least two rows of sub-aperture tapered structures, wherein at least one row amongst the at least two rows of sub-aperture tapered structures is tipped at a first specified in-plane angle relative to another row amongst the at least two rows, the first specified in-plane angle oriented in the first in-plane direction; and
controllably steering the light beam in the first in-plane direction using a second beam steering portion comprising full-aperture beam steering elements to refract the light beam in the first in-plane direction.

18. The method of claim 17, wherein the first beam steering portion is configured to provide adjustment of an in-plane angle of the light beam in angular increments that are coarser than an angular steering resolution provided by the second beam steering portion.

19. The method of claim 18, comprising:
generating a first control signal electrically coupled to electrode structures comprising the first beam steering portion to provide selectable steering of the light beam to discretely-defined in-plane angular positions; and
generating a second control signal electrically coupled to electrode structures comprising the second beam steering portion to provide selectable steering of the light beam about the discretely-defined in-plane angular positions.

20. The method of claim 18, comprising coupling the light beam into a waveguide;
wherein controllably steering the light beam using the first and second beam steering portions comprises adjusting an index of refraction of an electro-optic material forming at least a portion of a cladding, the cladding configured to interact with a portion of the light beam guided by the waveguide.

* * * * *